United States Patent [19]

Chevalier et al.

[11] Patent Number: 5,727,382

[45] Date of Patent: Mar. 17, 1998

[54] AIRCRAFT RAM JET ENGINE FOR SUPERSONIC AND/OR HYPERSONIC FLIGHT

[75] Inventors: Alain Chevalier, Asnieres Les Bourges; Marc Bouchez, Bourges, both of France; Vadim Levine, Moscou, Russian Federation; Valery Avrachkov, Moscow, Russian Federation; Dimitri Davidenko, Moscou, Russian Federation

[73] Assignee: Aerospatiale Societe Nationale Industrielle, Paris, France

[21] Appl. No.: 671,345

[22] Filed: Jun. 27, 1996

[30] Foreign Application Priority Data

Jul. 12, 1995 [FR] France .................... 95 08417

[51] Int. Cl.$^6$ .................... F02K 7/10; F02K 7/08
[52] U.S. Cl. .................... 60/270.1; 60/271; 239/265.19; 244/74
[58] Field of Search .................... 60/235, 270.1, 60/271; 239/265.11, 265.19, 265.33, 265.37; 244/74

[56] References Cited

U.S. PATENT DOCUMENTS 3,279,194  10/1966  Chapman .
5,072,581  12/1991  Harshman .................... 60/270.1
5,226,455  7/1993  duPont .

FOREIGN PATENT DOCUMENTS 2222635  10/1987  United Kingdom .

Primary Examiner—Charles G. Freay
Assistant Examiner—Ted Kim
Attorney, Agent, or Firm—Fisher, Christen & Sabol

[57] ABSTRACT

The present invention relates to an aircraft ram jet engine for supersonic and/or hypersonic flight, intended to operate over a wide range of speeds.

According to the invention, the ram jet engine comprises a ram jet engine body (5) including a combustion cheer portion (6) and a jet pipe portion (7), and, in the vicinity of the transition region (8) between the combustion chamber (6) and the jet pipe (7), having a changing geometry passing progressively from a convergent then divergent longitudinal section, for speeds corresponding to a low Mach number, to an at least substantially constant then divergent longitudinal section for speeds corresponding to a high Mach number.

10 Claims, 3 Drawing Sheets

AIRCRAFT RAM JET ENGINE FOR SUPERSONIC AND/OR HYPERSONIC FLIGHT

The present invention relates to an aircraft ram jet engine for supersonic and/or hypersonic flight, intended to operate over a wide range of speeds. The range of speeds envisaged thus lies between Mach numbers of 1-2 to 15-20.

Up to the present, no ram jet engine has existed capable of operating over such a range of speeds, while constantly retaining maximum efficiency.

The object of the present invention is to fill this gap.

To this end, the aircraft ram jet engine for supersonic and/or hypersonic flight, intended to operate over a wide range of speeds, is noteworthy, according to the invention, in that it comprises:

an oxidant inlet, at least one fuel injector, a ram jet engine body including, on the one hand, a combustion chamber portion, in which the oxidant and fuel intended to be burned are mixed, and, on the other hand, a jet pipe portion, intended to channel the gases leaving the combustion chamber, said ram jet engine body, in the vicinity of the transition region between the combustion chamber and the jet pipe, having a changing geometry passing progressively from a convergent then divergent longitudinal section, for speeds corresponding to a low Mach number, to a substantially constant then divergent longitudinal section for speeds corresponding to a high Mach number.

Such a structure provides a progressive matching, as a function of the flight speed, of the Geometry of the ram jet engine body in its entirety, but particularly in the vicinity of the transition between the combustion chamber and the jet pipe (nozzle throat) in order, in the wide range of speeds indicated, to retain optimal flight conditions, in particular a maximum thrust value independently of the external conditions (fuel consumption, aerodynamic pressure, profile of the oxidant (air) flow into the corresponding inlet). In other words, this in particular amounts to making the nozzle throat (convergent-divergent geometry) existing at "low" speed "disappear" so as eventually (at Mach number equal to or greater than about 8) to obtain a constant cross section of the combustion chamber, followed by the divergent cross section of the jet pipe.

In particular, in the case in which said ram jet engine body has the general shape of a duct of rectangular cross section, consisting of opposed pairs of walls, at least one of said walls includes plates articulated with respect to each other and, as the case may be, to the ends of said wall by respective spindles transverse to the longitudinal extension of the body of the ram jet engine, the relative position of at least some of said plates defining the changing geometry of the transition region between the combustion chamber and the jet pipe.

For preference, in order to allow the relative articulation movement of said plates, at least some of them are produced in two parts having a region of overlap.

Moreover, it is advantageous for the plate at the jet pipe end to have a triangular cross section, one vertex of which is turned toward the inside of the body of the ram jet engine, the other two vertices corresponding to the respective articulation spindles of said plate.

According to another characteristic of the invention, said articulated plates and/or flame holders are actuated by a set of jacks or the like, driven by the on-board computer of the aircraft on the basis of signals originating from a device for measuring a parameter related to the flight speed.

For preference, said measuring device comprises at least one thrust sensor and/or static pressure measuring means which are arranged in the combustion chamber.

Moreover, the combustion chamber is subdivided into a diffusion region, where supersonic combustion starts, and a chamber region, where subsonic combustion takes place, behind the retractable flame holders and where supersonic combustion terminates.

Moreover, the fuel injectors can be arranged immediately upstream of the combustion chamber, in the axis thereof and in the region of the oxidant inlet, ensuring distribution of the fuel throughout the stream, while an ignition device is advantageously provided in the combustion chamber.

Additionally, it is preferred that, as fuel, kerosene be used for the lowest flight Mach numbers, and hydrogen for the highest Mach numbers.

The figures on the attached drawing will give a good understanding of how the invention can be produced.

The aircraft ram jet engine 1, shown in the figures, for supersonic and/or hypersonic flight, is intended to operate in a wide range of speeds, that is to say from a Mach number of 1–2 to a Mach number of 15–20.

Figure 2:
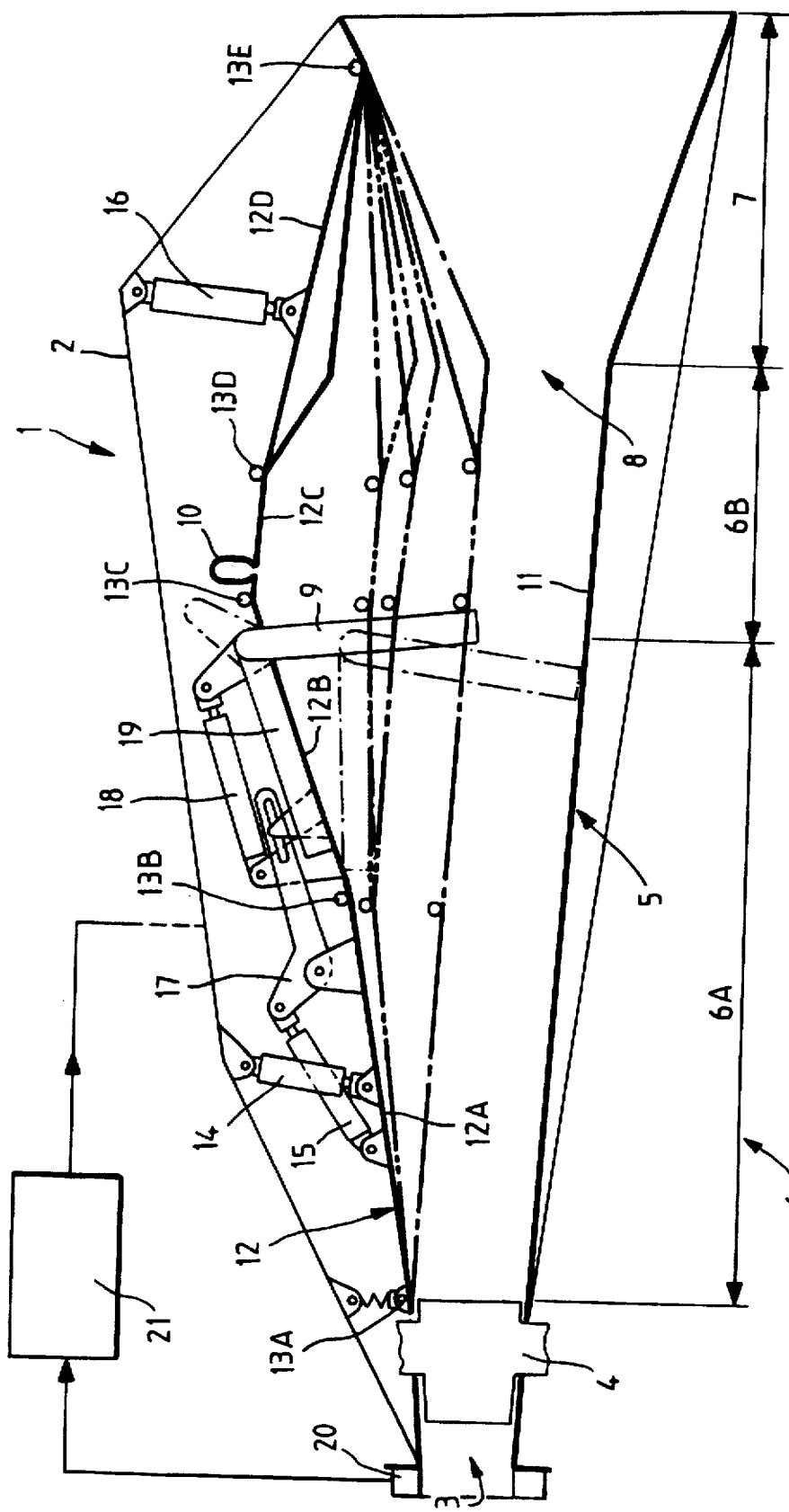
FIG. 2 is a view in longitudinal section of the ram jet engine according to FIG. 1.

In a housing or casing 2, the ram jet engine 1 comprises:

an oxidant inlet 3, particularly an air intake, upstream of the engine, installed under the underside of the fuselage of the aircraft associated with the ram jet engine, fuel injectors 4, provided upstream of the body 5 of the ram jet engine, said body 5 being broken down, as can be seen better in FIG. 2, into a combustion chamber portion 6 and a jet pipe portion 7, defining between them, as will be seen in greater detail in what follows, a transition region (or throat) 8, defined by a changing convergent-divergent geometry, according to the invention, as a function of speed, that is to say of the Mach number, at which the ram jet engine is operating.

Moreover, combustion chamber 6 is itself subdivided into a diffusion region 6A, where supersonic combustion starts, and a chamber region 6B, where subsonic combustion takes place, behind the flame holders 9, and where supersonic combustion terminates, the injectors 4 distributing the fuel throughout the stream. An ignition device 10 (FIG. 2) is provided within the chamber 6B. It will be noted that, as fuel, it is envisaged to use kerosene for the lowest flight Mach numbers (up to Mach 8) (with an admixture of hydrogen, if needs be, so as to facilitate ignition of the ram jet engine and pluming of the jet), then hydrogen for the higher Mach numbers. Other fuels, such as methane, endothermic hydrocarbons, synthetic fuels, may also be employed for an engine of this type.

Figure 1:
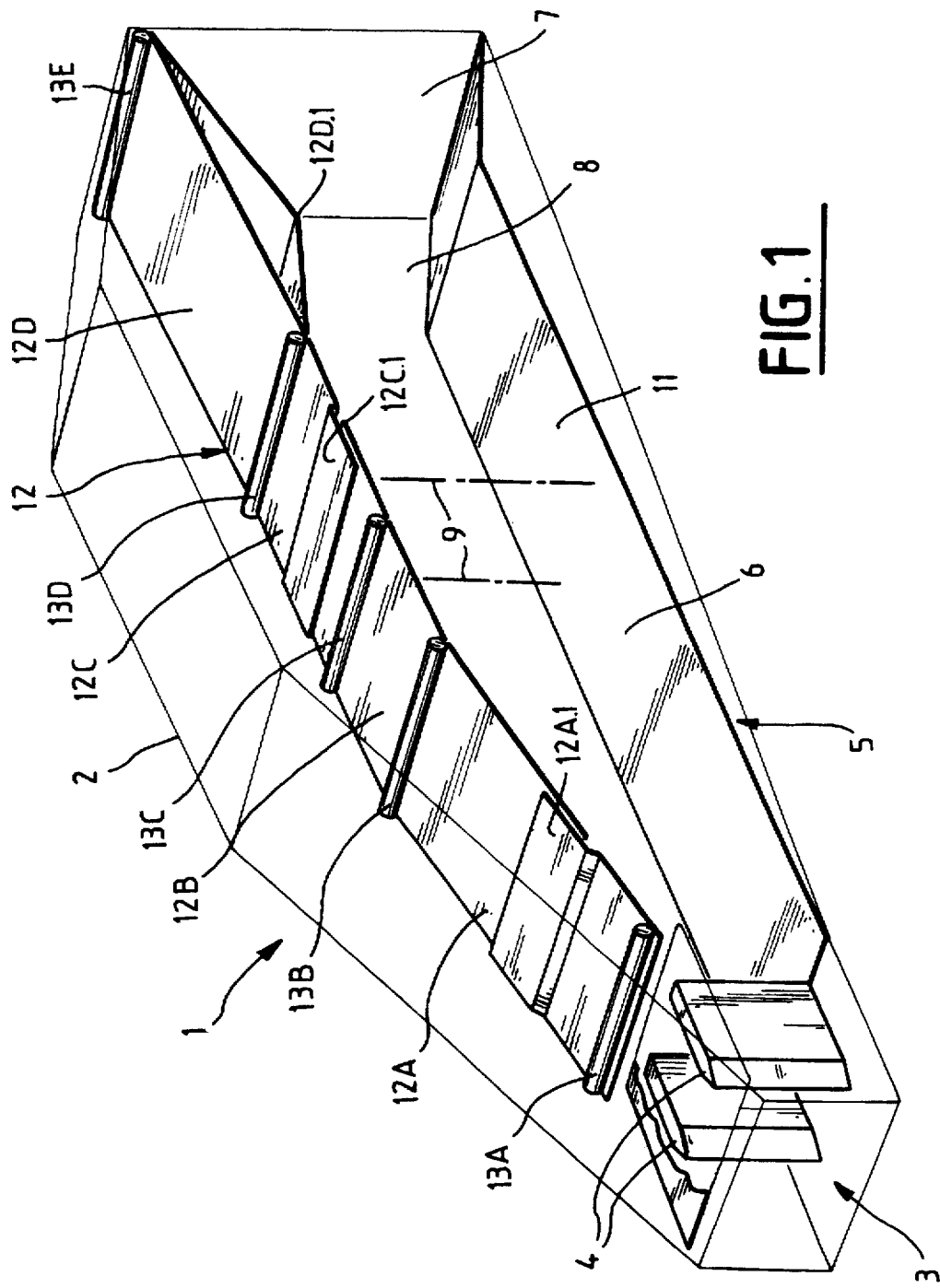
FIG. 1 is a diagrammatic view in perspective of an embodiment of a ram jet engine in accordance with the invention.

In the example embodiment represented, the body 5 of the ram jet engine overall exhibits the shape of a duct of rectangular cross section, consisting generally of two pairs of opposed walls, only the lower, 11, and upper, 12, walls of which are visible in the figures. For reasons of clarity, the corresponding side walls have not been represented on the drawing. In order to obtain the changing geometry which is the subject of the invention, the upper wall 12 consists of plates 12A–12D articulated to each other and to the ends of the wall 12 by respective spindles 13A–13E transverse to the longitudinal extension of the body 5 of the ram jet engine. In order to allow the relative articulation movement between the various plates 12A–12D, some of them, as shown in FIG. 1, namely, in this example, plates 12A and 12C, are produced in two parts having a region of overlap 12A.1, 12C.1 (not represented in FIG. 2).

It is quite clear that such a configuration is not in any way limiting, both as far as the moving wall "chosen" is concerned, and the number of plates which constitute it. In particular, another wall, or several walls, of the ram jet engine could have been designed to exhibit such "mobility" with the aim of achieving the stated objective.

Moreover, at the jet pipe 7 end, the particular structure of plate 12D will be noted, exhibiting a triangular cross section of convergent/divergent profile, one vertex 12D.1 of which is turned toward the inside of the body 5 of the ram jet engine, and the other two vertices corresponding to the articulation spindles 13D and 13E, this structure being related to the siting and to the function of said plate 12D, in fact constituting one wall of the jet pipe 7.

The mobility of the plates 12A–12D is provided, as can be seen in FIG. 2, by a set of jacks 14, 15, 16, combined, as the case may be, with a corresponding rod linkage (17 for jack 15). Similarly, a jack 18 provides the positioning and, as the case may be, the retraction (cavity 19) of each flame holder 9. All the jacks and rod linkages above have been omitted from FIG. 1 for reasons of clarity of the drawing.

The operation of the ramjet engine assumes that, having received a signal from a device 20 which measures thrust, which is an integral linear function of the operational efficiency of the ram jet engine, the onboard computer 21 of the aircraft constantly tends to achieve an optimal geometry of the passage part of the combustion chamber (body 5 of the ram jet engine) by virtue of the corresponding actuation of the control jacks 14, 15, 16 of the articulated plates 12A–12D of the wall 12. As a measuring device, the use of a thrust sensor can be envisaged, detecting the value of the longitudinal (axial) force generated while the ram jet engine is operating, that is to say the thrust. The value of the thrust is determined by the efficiency of the operating process: the efficiency of combustion and the total pressure recovery ratio (a function of the total hydraulic losses of the ram jet engine). The level of these two parameters depends on the geometry of the passage part (at each point of the trajectory) and on the efficiency of the stabilization means (flame holders 9) which in fact also represent a geometric control.

The regulation (the on-board computer 21) acts on the control system in order to have maximum performance essentially from a few pressure measurements judiciously provided for in the engine and from various other items of information (fuel flow rates, aircraft speed, for example). In fact, the thrust sensor is useful above all during development trials on the ground and in flight, as the case may be, so as to verify that the regulation envisaged actually makes it possible to maximize the propulsive performance.

Figure 3A:
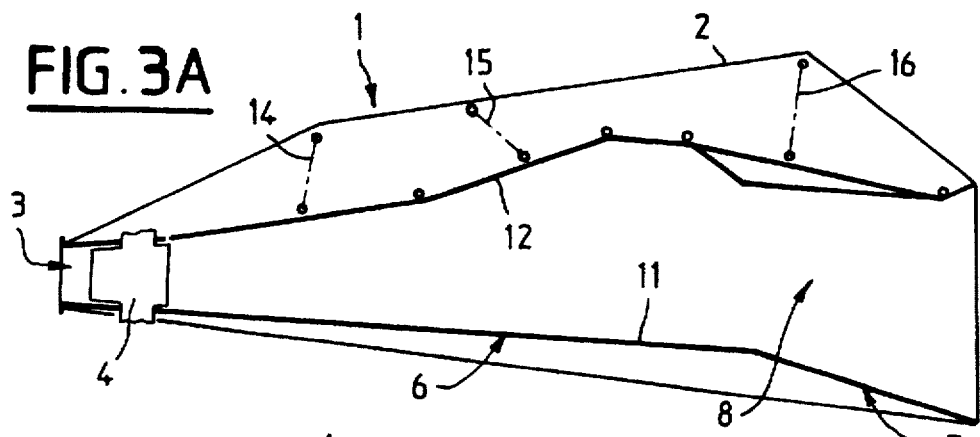
FIGS. 3A–3D illustrate various configurations of the ram jet engine of FIGS. 1 and 2, corresponding to different speed conditions.
Figure 3B:
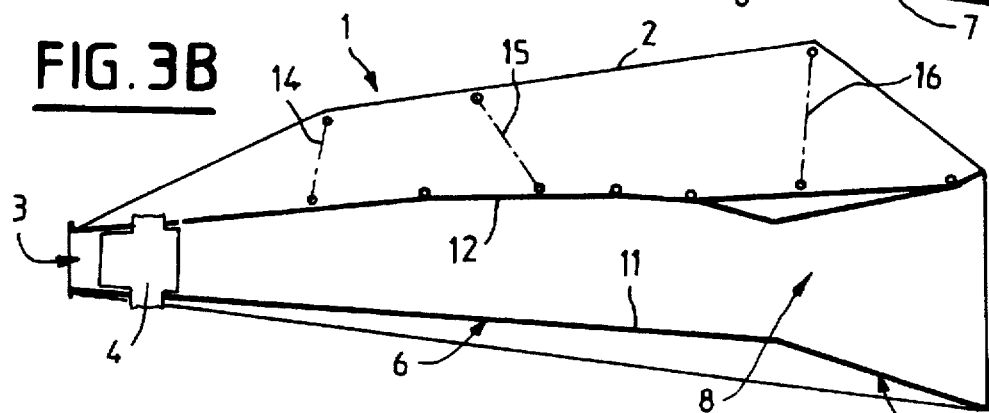

For a flight speed lying in the range Mach 1–2 to about Mach 6, the combustion chamber operates under subsonic combustion conditions, corresponding to the flame holders 9 being extended and placed in the diffuser of the chamber, in the passage part, modifying the geometry of the passage part as a function of the commands sent by the on-board computer 21, receiving and processing the signals from the thrust sensor 20. The combustion chamber has a maximum passage cross section under subsonic combustion conditions for a Mach number of 1–2 (FIG. 3A), which decreases toward the higher Mach numbers ($\leq 6$), FIG. 3B, by "closing" the articulated plates 12A–12D of the wall 12 toward the opposite wall 11, while preserving throat geometry (convergent-divergent) in the transition region between the combustion chamber and the jet pipe.

The flame holders 9 slow down the supersonic flow and a normal shock or an array of equivalent shocks is established between them and the injectors 4 (that is to say in the diffuser) and, after this shock, the flow becomes subsonic. The fuel flowing from the injectors is delivered into the flow, the ignition device 10 is actuated and ignites the fuel-air mixture. After the flame holders, the gas forms vortices and stable flames, that is to say regions of stabilization, appear. These regions of stable flames promote the combustion process in the chamber.

The positioning of the injectors, as shown, upstream of the combustion chamber, makes it possible to distribute the fuel uniformly in the airflow and to cause the streams of fuel to break up, while guaranteeing reliable pressurization of the combustion chamber, in the region where the geometric control of the passage part takes place. Their positioning in the control region would seriously complicate, and even under certain conditions prohibit, the combustion chamber being pressurized.

Figure 3C:
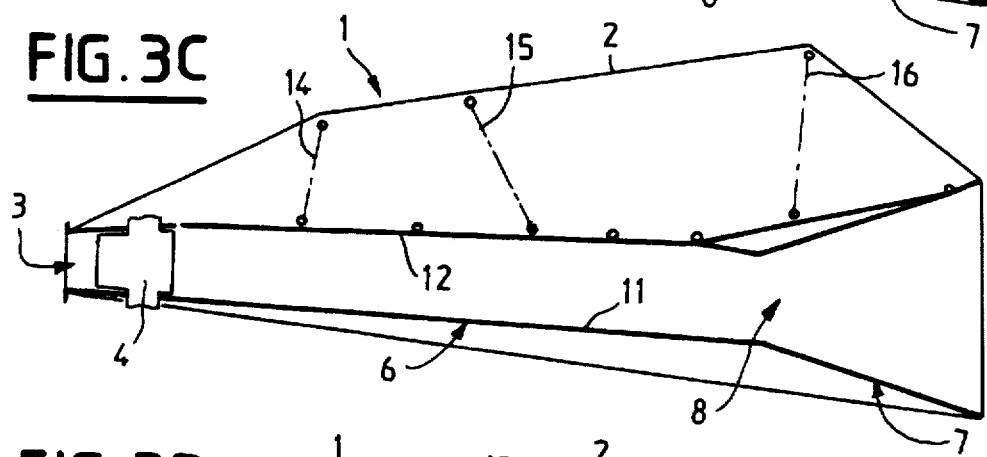
Figure 3D:
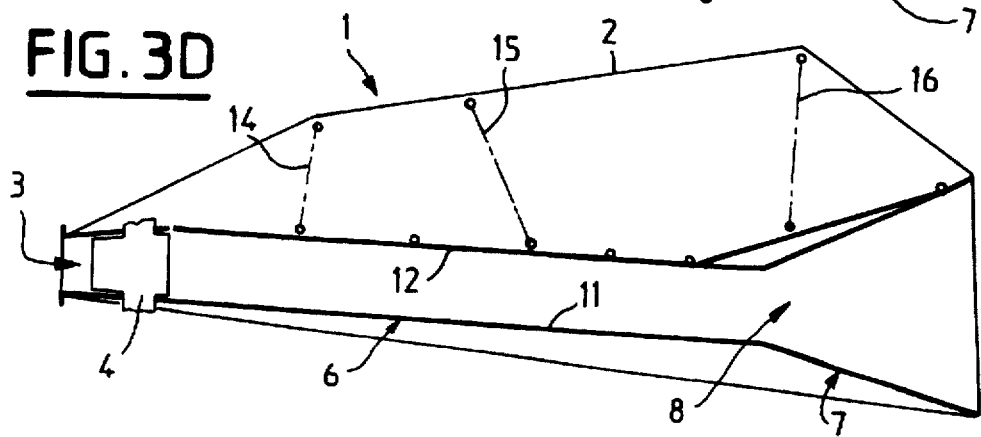

As has already been noted, as the flight speed increases, the volume of the passage part and that of the transition region between the combustion chamber and the jet pipe (throat 8) are reduced. When the flight speed exceeds about Mach 6, it is necessary to provide for supersonic combustion in the combustion chamber. To that end, the flame holders 9 are withdrawn from the flow and the throat part (convergent-divergent geometry) disappears, preserving a uniform cross section of the passage part of the combustion chamber being connected directly to the divergent jet pipe part 7 (FIG. 3D). In this case, the normal shock is converted into a system of oblique shocks, and combustion stabilizes after the oblique shocks have played the role of combustion stabilizers. Having received the corresponding signal from the thrust sensor 20, the computer 21 sets the shape of the body 5 of the ram jet engine to conform to maximum thrust.

In fact, the abovementioned constant-cross section geometry of the passage part can be implemented only after the risks of thermal blocking have disappeared (above about Mach 7–8). Under intermediate speed conditions (about Mach 6–7) between the configurations of FIGS. 3B and 3D, a geometry with retracted throat is employed, which has to be sufficiently divergent to operate in supersonic combustion without the risk of thermal blocking (FIG. 3C).

We claim:

1. An aircraft ramjet engine for supersonic and/or hypersonic flight, for operating over a wide range of speed values corresponding to a range of Mach numbers from 1 to 20, comprising:

an oxidant inlet (3) for an inlet stream of oxidant gas;

at least one fuel injector (4) which is arranged in said oxidant inlet (3) and injects either a liquid fuel or a fuel gas into said inlet stream;

a variable geometry combustion chamber (6) having a variable cross section, which is arranged immediately downstream of said at least one fuel injector (4) and in which a mixture of oxidant and fuel is produced and burned;

a variable geometry divergent jet pipe (7), which is arranged immediately downstream of said combustion chamber (6) and which channels gases leaving said combustion chamber; and a variable geometry throat (8) which is arranged between said combustion chamber (6) and said jet pipe (7), wherein, as said Mach number increases, said variable geometry combustion chamber (6) and said variable geometry jet pipe (7) change geometry to progressively smooth out said throat (8) and reduce said variable cross section of the combustion chamber (6), so that, at Mach values greater than Mach 7, said throat (8) and said combustion chamber (6) have a uniform cross section, and said throat (8) has disappeared.

2. The ram jet engine as claimed in claim 1, having a ram jet engine body (5) with a generally rectangular cross section, said body having an inside and a longitudinal dimension from the oxidant inlet (3) to the jet pipe (7), consisting of opposed pairs of walls defining a duct, wherein at least one (12) of said walls includes plates (12A–12D) articulated with respect to each other and to the ends of said wall (12) by respective spindles (13A–13E) transverse to the longitudinal dimension of the body of the ram jet engine (5), the relative position of at least some of said plates defining the changing geometry of the transition region (8) between the combustion chamber (6) and the jet pipe (7).

3. The ram jet engine as claimed in claim 2, wherein, in order to allow the relative articulation movement of said plates, at least some of said plates (12A, 12C) are produced in two parts having a region of overlap (12A.1, 12C.1).

4. The ram jet engine as claimed in claim 2, wherein the plate (12D) at the jet pipe (7) end has a triangular cross section, one vertex (12D.1) of which is turned toward the inside of the body of the ram jet engine (5), the other two vertices corresponding to the respective articulation spindles (13D, 13E) of said plate (12D).

5. The ram jet engine as claimed in claim 2, wherein said articulated plates (12A–12D) and/or flame holders (9) are actuated by a set of jacks (14, 15, 16, 18), driven by the on-board computer (21) of the aircraft on the basis of signals originating from a device (20) for measuring a parameter related to the flight speed.

6. The ram jet engine as claimed in claim 5, wherein said measuring device comprises at least one thrust sensor (20) and/or static pressure measuring means which are arranged in the combustion chamber.

7. The ram jet engine as claimed in claim 1, wherein the combustion chamber (6) is subdivided into a diffusion region (6A), where supersonic combustion starts, and a chamber region (6B), where subsonic combustion takes place, behind the retractable flame holders (9) and where supersonic combustion terminates.

8. The ram jet engine as claimed in claim 1, wherein an ignition device (10) is provided in the combustion chamber.

9. The ram jet engine as claimed in claim 1, wherein, as fuel, kerosene is used for the Mach numbers up to Mach 8.

10. The ram jet engine as claimed in claim 1, wherein fuel comprising hydrogen is used.

* * * * *